United States Patent [19]

Laine

[11] Patent Number: 5,034,205
[45] Date of Patent: Jul. 23, 1991

[54] METHOD OF REMOVING SULPHUR OXIDES FROM FLUE GASES

[75] Inventor: Jouko Laine, Tampere, Finland

[73] Assignee: Oy Tampella AB, Tampere, Finland

[21] Appl. No.: 266,486

[22] Filed: Nov. 2, 1988

[30] Foreign Application Priority Data

Nov. 4, 1987 [FI] Finland ................................ 874873

[51] Int. Cl.$^5$ ....................... C01B 17/00; B01J 8/00
[52] U.S. Cl. .................................................. 423/244
[58] Field of Search ....................... 423/244 A, 244 R

[56] References Cited

U.S. PATENT DOCUMENTS

| | | | |
|---|---|---|---|
| 2,718,453 | 9/1955 | Beckman | 423/244 |
| 4,277,450 | 7/1981 | Dilworth | 423/244 |
| 4,309,393 | 1/1982 | Nguyen | 423/244 |
| 4,788,047 | 11/1988 | Hamala et al. | 423/244 |
| 4,867,955 | 9/1989 | Johnson | 423/244 |

FOREIGN PATENT DOCUMENTS 45-1168  1/1970  Japan ................................ 423/244

Primary Examiner—Gregory A. Heller
Attorney, Agent, or Firm—Ladas & Parry

[57] ABSTRACT

A method of removing sulphur oxides from flue gases, in which method lime such as calcium carbonate is fed into a separate reactor space positioned in a boiler. In the reactor space the lime is converted into calcium oxide and carbon dioxide under the influence of the temperature prevailing in the furnace of the boiler. Pressurized air causes the calcinating lime and the obtained calcium oxide to flow through the tubular space, whereby at the other end of the space substantially all lime has been converted into oxide and is fed therefrom into the boiler among its flow of flue gases for the actual desulphuration reaction.

5 Claims, 1 Drawing Sheet

METHOD OF REMOVING SULPHUR OXIDES FROM FLUE GASES

FIELD OF THE INVENTION

The method relates to a method of removing sulphur oxides from flue gases, in which method lime such as calcium carbonate and/or calcium magnesium carbonate is fed into the furnace of a boiler for converting it by the heat of the furnace into calcium oxide which is reacted in the flue gases with sulphur oxides, and in which the dustlike calcium sulphite and calcium sulphate obtained as a reaction product are separated from the flue gases.

BACKGROUND OF THE INVENTION

Such a method is known inter alia from U.S. Pat. Nos. 4,519,995 and 4,559,211, in both of which powderlike lime is fed by injection into the furnace of a boiler, wherein the lime is converted to oxide under the influence of heat then reacts with the sulphur oxides contained in the flue gases. The reaction results in the formation of calcium sulphite and calcium sulphate in dust form. This dust is carried with the flow of flue gases into dust separators, in which fly ash and other dustlike components are removed from the flue gases before the flue gases are discharged into the atmosphere through a chimney. Both these solutions have the drawback that the lime is blown in the boiler to a point determined by the structure of the boiler and geometrical considerations, as a result of which it is impossible to control the reaction conditions after blowing. After blowing the lime dust proceeds at a rate determined by the gas flow in the boiler and at a temperature prevailing therein, wherefore the process, though apparently systematic, is chemically uncontrollable so that its desulphuration capacity is partially arbitrary. Further, the process can be regarded as uncontrollable because the time the the lime is present in the boiler and, as a consequence, the conversion of lime to oxide, the calcination process and the reaction of oxide with sulphur, for example, are solely designed to meet the thermic requirements set for the boiler, whereas sulphur purification reactions have not been taken into account in the design.

For these reasons, prior art methods of desulphuration do not provide the best possible desulphuration effect as both the desulphuration capacity and economy of the prior art methods are insufficient, and the achievement of the required effect is technically complicated as well as expensive.

SUMMARY OF THE INVENTION

The object of the present invention is to improve the desulphuration capacity of a desulphuration process carried out by injection into the boiler. This object is achieved according to the invention in such a manner that the lime is fed for calcination into at least one separate space positioned in the furnace of the boiler and free from the flue gases, the position of said space being such that the temperature warming it up is advantageous to the calcination of the lime, the time the lime is present is adjusted to be suitable for the calcination, and, the calcium oxide formed in said space is then passed into the boiler for the desulphuration of the flue gases.

The method according to the invention is based on the idea that the lime is calcinated in a separate space free from the flue gases at an optimum calcination temperature and the time it is present in the space is adjusted so that it is calcinated substantially completely before the lime dust is passed into the boiler for purifying the flue gases contained therein. In this way, the calcination can be carried out as efficiently as possible. Moreover, the oxide so obtained reacts with sulphur to form calcium sulphite and calcium sulphate as efficiently as possible and with an optimum temperature profile for this reaction, whereby the entire desulphuration process can be optimized by carrying it out at two stages. Further, one aspect of the invention is that since the calcination takes place in a separate space free from the flue gases, its reaction is not dependent on gas flows or temperature profiles determined by the thermic operation of the boiler, but the calcination is throughout carried out at a selected, predetermined temperature prevailing in the furnace of the boiler. It is not until after calcination that the reactions between calcium oxide and sulphur oxides occur under conditions determined by the flow rate of the flue gases.

The invention will be described in more detail in the detailed description with reference to the attached drawings.

DETAILED DESCRIPTION

Figure 1:
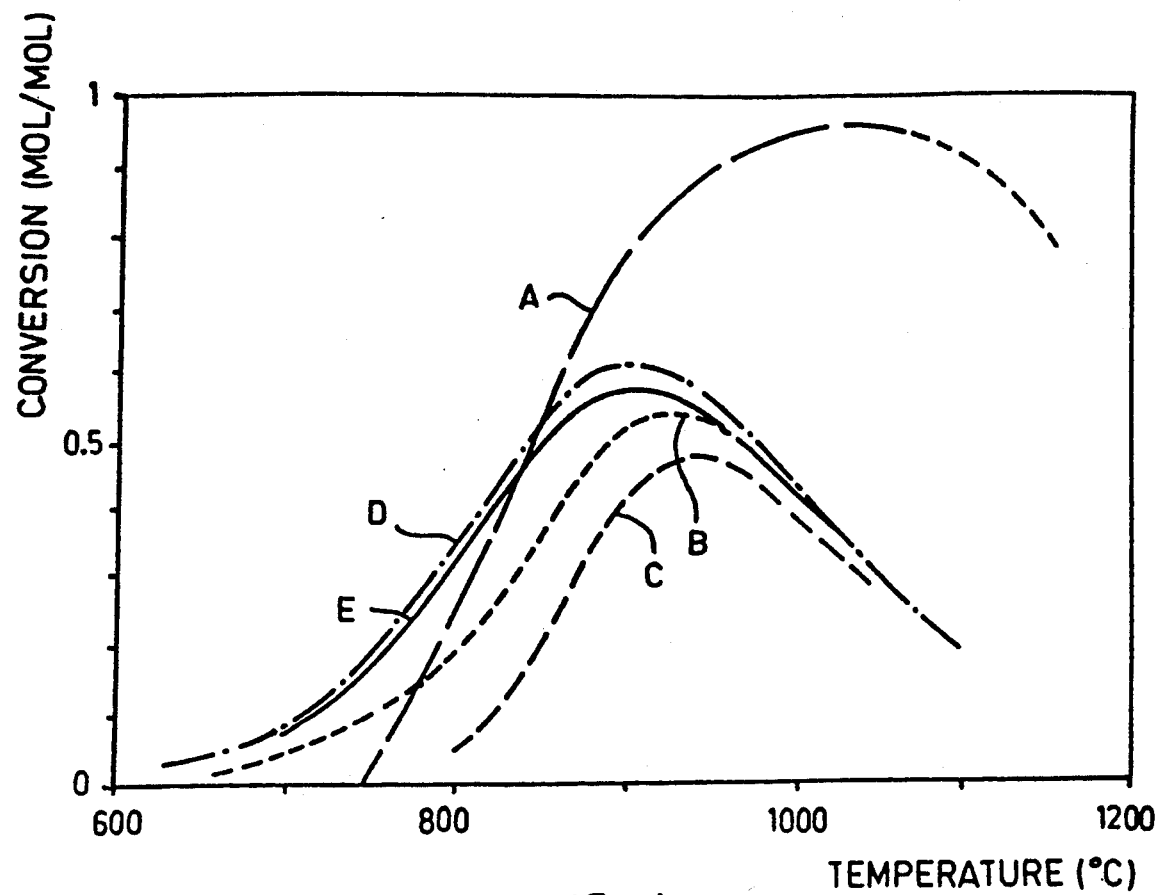
FIG. 1 illustrates the reactron degree of the different desulphuration reactions, i.e., the conversion as a function of time, and the total sulphur conversion so obtained when using the prior art method and the method according to the invention.

Desulphuration comprises a number of different reactions. The main reactions describe the removal of sulphur dioxide in the following way

$$CaCO_3 \rightleftharpoons CaO + CO_2 \qquad (1)$$

$$CaO + SO_2 \rightleftharpoons CaSO_3 \qquad (2)$$

$$2CaSO_3 + O_2 \rightarrow 2CaSO_4 \qquad (3)$$

The process also comprise,s a number of other reactions which, however, are not of great importance to the process as a whole.

Reaction (1) is reversible and endothermal under hot conditions. Reaction (2) is also reversible but exothermal. Reaction (3) is irreversible and exothermal. Since reactions (1) and (2) are rather rapid and, on the other hand, prerequisites to the occurrence of reaction (3), the invention concentrates mainly on the optimization of reactions (1) and (2).

FIG. 1 shows the conversions of the different reactions, that is, the reaction degrees as a function of temperature affecting the reaction. Curve A represents the dependence of the conversion of reaction (1) on temperature when the reaction time or the time the lime is involved in calcination is one second. As appears from the curve, a preferred reaction temperature is about 900° to 1100° C. Below this temperature range, the degree of conversion decreases sharply with decreasing temperature. Correspondingly, the lime is sintered at temperatures above this range, which deteriorates the reactivity of lime. Curve B, in turn, represents the conversion of reaction (2) during one second, and curve D the same reaction when the reaction time is two seconds.

In prior art methods, reaction (1) and reaction (2) occur simultaneously with the same time period with same temperature profile, whereby the reaction time of both reactions is too short when the total time interval is about 1 to 2 second. The end result from this prior method is approximately the mathematical product of the conversions of reaction (1) and reaction (2). The product is represented by curve C.

In the method according to the invention, reaction (1) can be optimized by feeding the lime into a space positioned in the furnace of the boiler separately from the flue gases, where it stays during the calcination process. Thereby only the heat of the furnace affects the calcination and the time the lime is present in the space can be adjusted by means of a high solids-gas ratio in such a way that a degree of conversion as high as possible is obtained as described by curve A. From the space the lime is then introduced into the boiler among its flue gases, whereby the entire period of the lime is present among the flue gases of the boiler can be utilized as the reaction time of reaction (2), the conversion according to curve D being obtained. Curve E, which is the product of the maximum conversion of curve A and the conversion of curve D, proves that the method according to the invention provides a total conversion which is considerably above the conversion level of curve C representing the prior art method. It is self-evident that the above-mentioned curves are drawn at different positions for different time periods for the reaction stages or different kinds of lime. What is essential however, that curve E is always positioned above curve C under the conditions according to the method.

Figure 2:
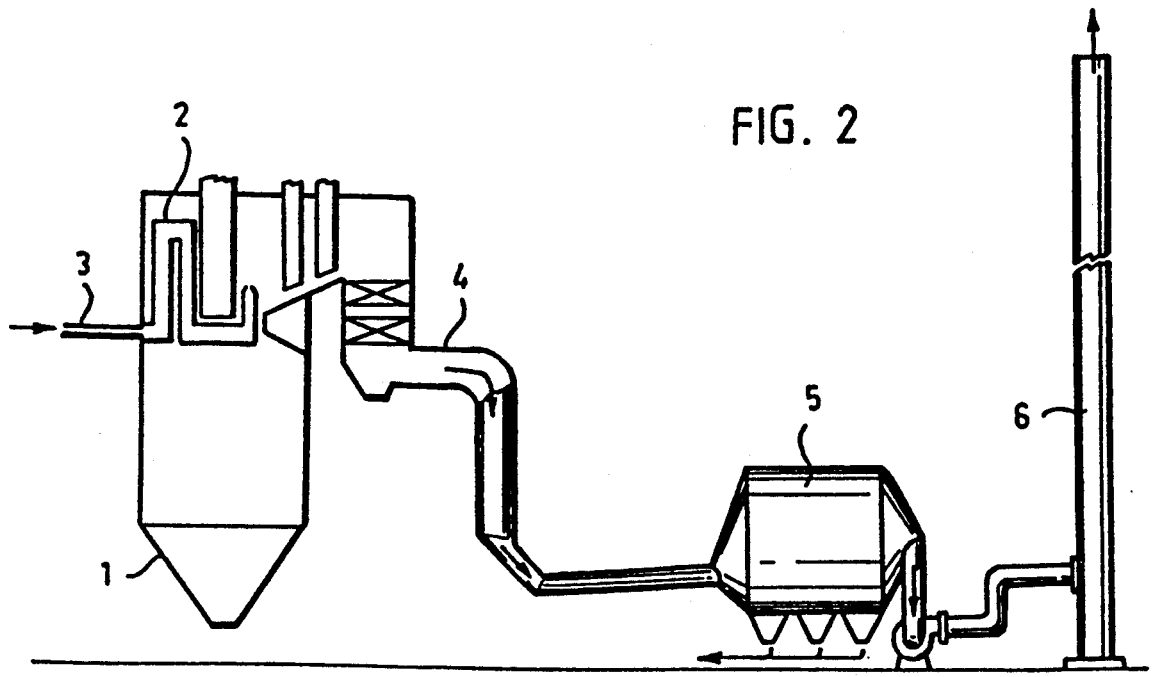
FIG. 2 illustrates schematically an application of the method according to the invention in a power plant boiler.

FIG. 2 shows an application of the method according to the invention in a power plant boiler. The operation of the boiler 1 and the apparatuses required therefor are generally known, wherefore they will not be described in more detail herein. Calcium carbonate or the like having a high dry content is introduced into a tubular space 2 positioned in the furnace of the boiler 1 through a channel 3 e.g. by means of pressurized air or some other suitable carrier gas. The lime flows on along the tubular space 2, being thus exposed to the heat of the furnace of the boiler and decomposed to calcium oxide and carbon dioxide. When the tubular space 2 is positioned suitably, the temperature of the furnace around the space is about 900° to 1100° C., at which temperature the calcination process takes place most efficiently. By varying the flow rate of lime in the space 2, the period the lime is can be adjusted to be advantageous to the calcination, thus obtaining an optimal conversion. After the calcination of the lime is completed, it is discharged with the carrier gas through one end of the space 2 so as to be mixed with the flue gas flow of the boiler 1. Reaction (2) is thereby initiated immediately in the lime which has been calcinated substantially completely, and the period the lime is in the flue gas flow can be utilized mainly for effecting reaction (2). The step according to reaction (3) takes place immediately after reaction (2). The flue gas flow and the entrained dustlike calcium sulphite and calcium sulphate obtained as a reaction product pass along a flue gas channel 4 into a dust separator 5 in which the dustlike components are separated from the flue gases. From the dust separator the flue gases are further discharged into the atmosphere through a chimney 6.

Depending on the temperature, a preferred reaction time of reaction (1) is 0.3 to 1 seconds, whereby the calcination takes place at a sufficient level. In order for reaction (1) to occur systematically and in a controlled way, it is to be preferred that the calcination is carried out in a space in which the carrier gas and the lime form a continuous blocking flow so that fresh lime enters preferably through one end of the tubular space and is discharged after calcination out of the space through the other end thereof. Since reaction (1) is endothermal, it remains controlled in this kind of space as long as the ambient temperature does not exceed 1100° C. because the heat energy required for the reaction and the carrier gas keep the temperature slightly below the temperature prevailing outside the space.

The ambient temperature is important in the exothermal reaction (2) because when the temperature of the flue gases is high, reaction (2) tends to be balanced to a determined state especially when the temperature is constant. In order for reaction (2) to be effected as efficiently as possible, it is preferable to feed the lime into flue gases having a temperature of about 850° to 950° C. at the feeding moment. It is further to be preferred that the temperature of the flue gases drops substantially evenly when the reaction proceeds, whereby reaction (2) is easier to optimize and takes place in 1 to 2 seconds so that the total reaction can be optimized.

An advantage of the method according to the invention is that when lime is calcinated before it is fed among the flue gases, the desulphuration reaction itself has more time to occur so that the total reaction degree is improved. Furthermore, the calcination can be carried out under optimum conditions so that the entire desulphuration process is completely controllable. As a consequence, both the desulphurating capacity and the economy of the method of the invention are superior to those of prior art methods.

The invention is by no means restricted to the above-described embodiments, but can be modified in various ways within the scope of the claims. The separate space free from the flue gases for the oxidation process can be of some other shape and the lime can be fed therein at different points, depending on the shape of the space and the carrying of the lime to be effected therein. There may be two or more spaces of this kind and they can be positioned side by side or partly or wholly one after another in the direction of flow of the flue gases, e.g., for compensating for temperature variation caused by variation in the degree of utilization of the boiler, etc. It is thereby possible to feed the lime only into a reaction space in which the temperature is the most suitable for the calcination and when the operating situation changes it is even possible to change the calcination reactor to be used. In place of a gas flow, it is possible to feed the lime e.g. by means of a screw conveyor along the tubular channel or in some other known manner into the space where it is to be calcined and then away therefrom. The reaction spaces may be e.g. tubular channels, whereby lime is fed through one end of one or more of such channels and discharged from the other end of such channel or channels into the flow of flue gases, etc.

I claim:

1. A method of removing sulfur oxides from flue gases emanating from a furnace comprising feeding lime into at least one substantially confined space positioned within the furnace, said space being free from said flue gases and being heated by said furnace to a temperature adapted for calcination of said lime whereby at least some of the lime is converted into calcium oxide within said space, causing the calcium oxide so formed to pass from the space and to mix with the flue gases whereby the calcium oxide reacts with the sulfur oxides of the flue gases to form calcium sulphite and calcium sulphate, and separating the calcium sulphite and calcium sulphate from the flue gases, the lime being fed into said space by causing the gaseous medium carrying the lime to flow through the space in a continuous flow, said flow in turn causing the calcium oxide formed in the space to pass from the space and to mix with the flue gases, and adjusting the rate of said flow so that the residence time of the lime within the space is sufficient to assure a substantially complete calcination thereof, said space being defined by a tubular member having a body portion and two ends and wherein the lime is fed in through one end of the tubular member and the calcium oxide formed within the space is caused to pass out the other end of the tubular member.

2. A method as claimed in claim 1 wherein the lime comprises calcium carbonate or magnesium carbonate or both.

3. A method as claimed in claim 1 wherein the space is heated to a temperature of between about 900° and 1100° C.

4. A method as claimed in claim 3 wherein the rate of flow is adjusted so that the residence time of the lime within said space is from 0.3 to 1.0 seconds.

5. A method as claimed in claim 1 wherein the diameter of at least one of the ends of the tubular member is smaller than the diameter of the body portion so as to facilitate adjustment of the rate of flow of the gaseous medium through the space.

* * * * *